(12) United States Patent
Kämmerer

(10) Patent No.: US 8,474,910 B2
(45) Date of Patent: Jul. 2, 2013

(54) VEHICLE SEAT, IN PARTICULAR MOTOR VEHICLE SEAT

(75) Inventor: Joachim Kämmerer, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 373 days.

(21) Appl. No.: 12/853,529

(22) Filed: Aug. 10, 2010

(65) Prior Publication Data

US 2011/0037304 A1 Feb. 17, 2011

(30) Foreign Application Priority Data

Aug. 12, 2009 (DE) .......... 10 2009 037 816

(51) Int. Cl.
*B60N 2/12* (2006.01)
(52) U.S. Cl.
USPC ........... 297/334; 297/316; 297/321; 297/331; 296/65.09
(58) Field of Classification Search
USPC ............... 297/316, 321, 331, 334; 296/65.08, 296/65.09
See application file for complete search history.

(56) References Cited

U.S. PATENT DOCUMENTS

| | | | | |
|---|---|---|---|---|
| 4,699,418 A * | 10/1987 | Plavetich | | 296/65.09 |
| 6,595,588 B2 * | 7/2003 | Ellerich et al. | | 297/331 |
| 6,655,738 B2 * | 12/2003 | Kammerer | | 297/331 |
| 6,676,216 B1 * | 1/2004 | Freijy et al. | | 297/335 |
| 6,899,392 B1 * | 5/2005 | Saberan et al. | | 297/334 |
| 6,964,452 B2 * | 11/2005 | Kammerer | | 297/331 |
| 7,040,684 B2 * | 5/2006 | Tame et al. | | 296/65.09 |
| 7,134,725 B2 | 11/2006 | Hofmann et al. | | |
| 7,152,921 B2 * | 12/2006 | Saberan | | 297/336 |
| 7,300,107 B2 * | 11/2007 | Kammerer | | 297/336 |
| 8,297,703 B2 * | 10/2012 | Ehrhard | | 297/331 |
| 2009/0256379 A1 * | 10/2009 | Yamada et al. | | 296/65.08 |
| 2010/0052390 A1 * | 3/2010 | Dagcioglu et al. | | 297/324 |

FOREIGN PATENT DOCUMENTS

| | | |
|---|---|---|
| DE | 102006007139 | 8/2007 |
| DE | 11 2005 002 760 T5 | 9/2007 |
| EP | 1 535 792 A2 | 6/2005 |
| WO | 02/22391 A1 | 3/2002 |

* cited by examiner

*Primary Examiner* — Peter Brown
(74) *Attorney, Agent, or Firm* — McGlew and Tuttle, P.C.

(57) ABSTRACT

A vehicle seat includes a base (9) which includes at least one front foot (11). A seat (3) is connected in an articulated manner to the front foot by at least one front leg (13). At least one rear foot (21) is locked to the base (9) in at least one use position. At least one coupling (42) is provided between the seat and the rear foot. At least one coupler (30) is provided between the backrest and the coupling or the seat. The seat may be transferred from the use position into a boarding position as, after unlocking the rear foot, the seat pivots upwards and the backrest carries out a forward shifting movement by means of the rear foot. The seat may also be transferred from the use position into a flat-floor position, by the backrest pivoting forward and the seat being lowered by the coupler.

20 Claims, 3 Drawing Sheets

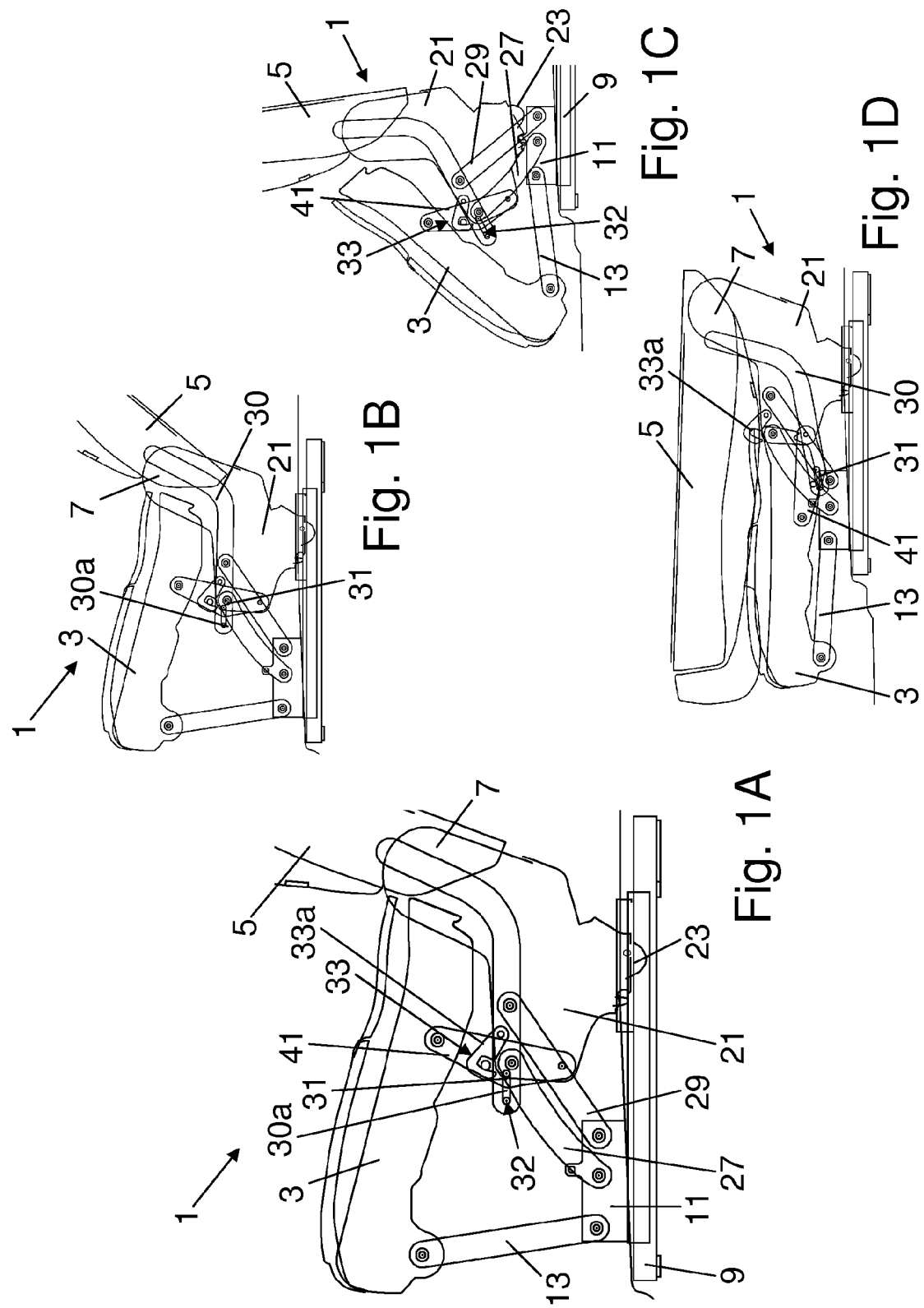

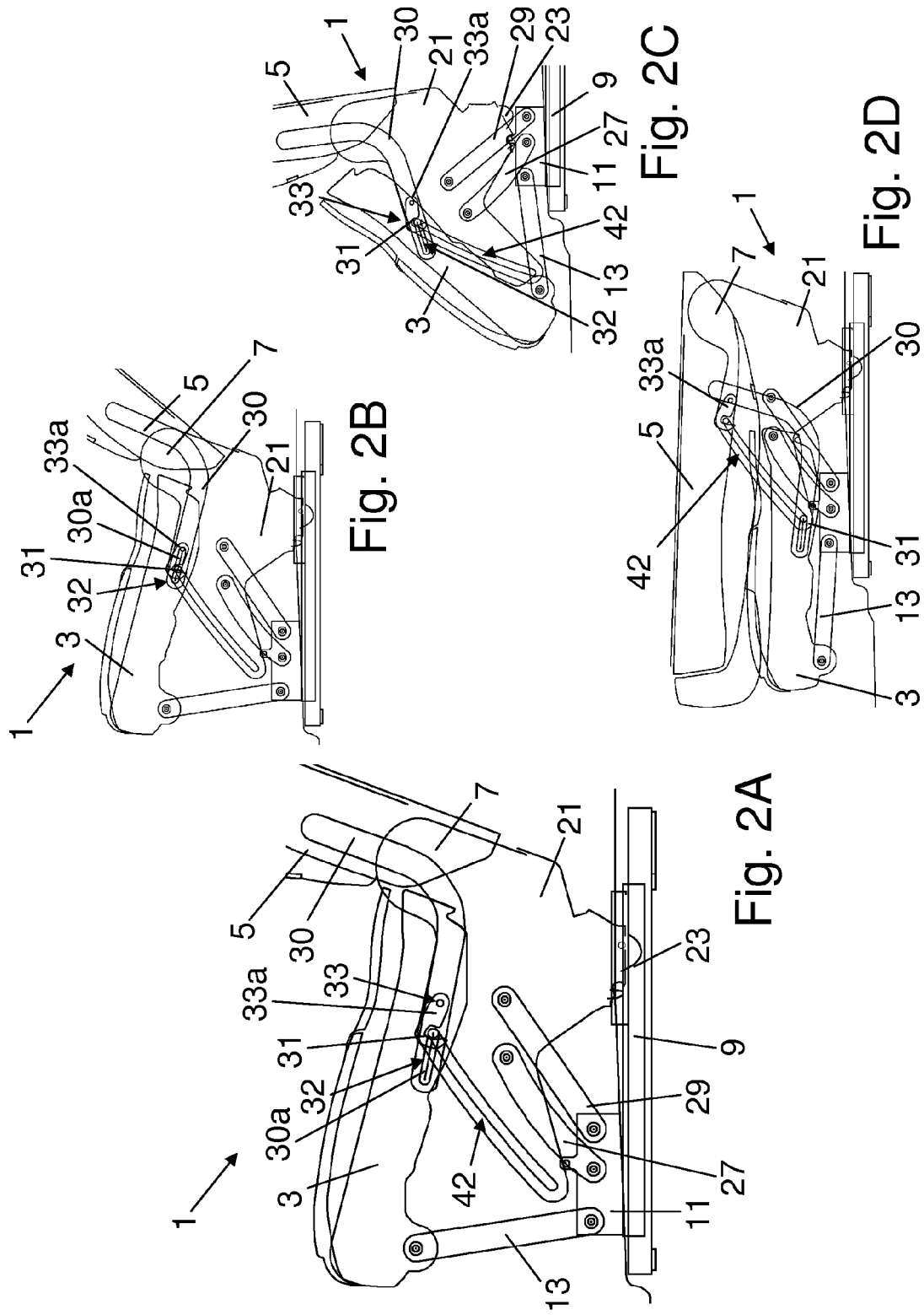

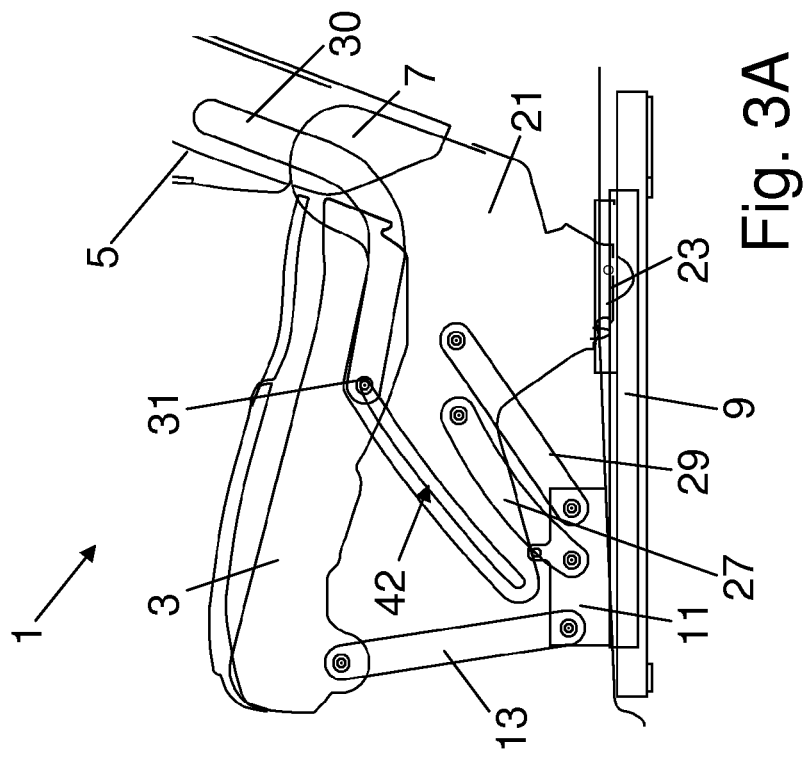
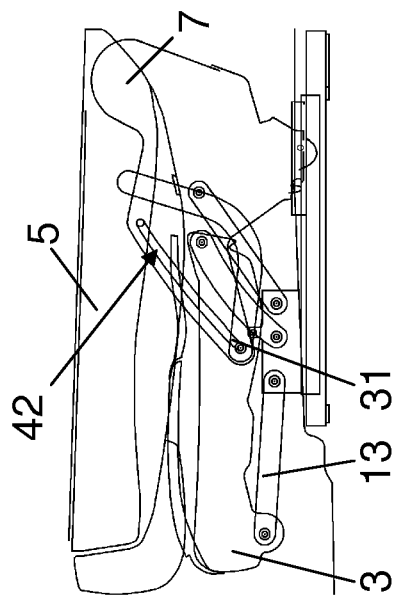
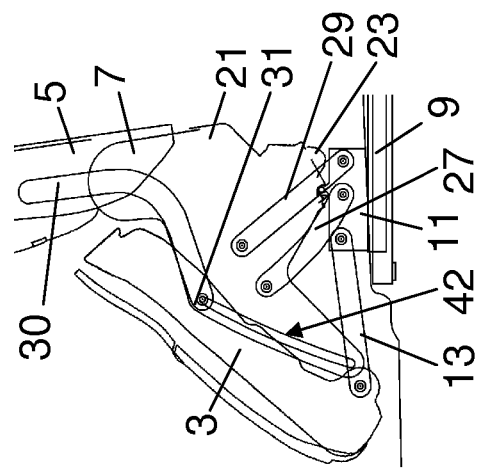
Fig. 3A
Fig. 3B
Fig. 3C

VEHICLE SEAT, IN PARTICULAR MOTOR VEHICLE SEAT

CROSS REFERENCE TO RELATED APPLICATIONS

This application claims the benefit of priority under 35 U.S.C. §119 of German Patent Application DE 10 2009 037 816.2 filed Aug. 12, 2009, the entire contents of which are incorporated herein by reference.

FIELD OF THE INVENTION

The invention relates to a vehicle seat, in particular a motor vehicle seat,

BACKGROUND OF THE INVENTION

The second and/or third seat row of multipurpose vehicles (MPV), such as for example vans or large-capacity passenger vehicles, are generally designed so that the interior may be adjusted in a variable manner for the transportation of passengers or goods. For example, a vehicle seat of the aforementioned type is disclosed in DE 10 2006 007 139 A1, which may be transferred from a use position into a position suitable for boarding or into a folded-down flat-floor position for increasing the loading area.

SUMMARY OF THE INVENTION

The object of the invention is to provide an alternative to the vehicle seat of the aforementioned type.

According to the invention, a vehicle seat is provided, in particular a motor vehicle seat, comprising a base which comprises at least one front foot, a seat cushion which is connected in an articulated manner to the front foot by means of at least one front leg and at least one rear foot, which is locked to the base in at least one use position suitable for conveying passengers by means of a first locking device. At least one guide rod is provided between the front foot and the rear foot with at least one coupling means between the seat cushion and the rear foot. A backrest is borne by the rear foot and at least one coupler is between the backrest, on the one hand, and the at least one coupling means or the seat cushion, on the other hand. The vehicle seat is able to be transferred from the use position into a boarding position as, after unlocking the rear foot, the seat cushion pivots upwards and the backrest carries out a forward shifting movement by means of the rear foot, guided by the guide rod. The vehicle seat is able to be transferred from the use position into a flat-floor position, by the backrest pivoting forward and the seat cushion being lowered by means of the coupler. The coupler is coupled to the at least one coupling means or the seat cushion by means of a first turning and sliding joint. A second locking device is provided which releasably locks the at least one coupling means.

The coupler is used, in the known manner, to transfer movements and partially also locked states of the backrest and of the seat cushion to one another and to adjust the backrest and seat cushion relative to one another. As the coupler is coupled by means of a first turning and sliding joint to the coupling means or the seat cushion, free travel is provided which permits a uncoupled movement of the coupler (and thus of the backrest) relative to the coupling means and to the seat cushion. Thus, in particular, it is possible to adjust the inclination of the backrest, leaving the seat cushion unaffected. For the function of the coupler relative to the locked states, the second locking device is thus provided which releasably locks the coupling means, independently of the locked state of the backrest.

The movement of the seat cushion and of the rear foot with the backrest relative to the front foot is controlled by the at least one coupling means, so that preferably a reduction to a single degree of freedom may be achieved. The boarding position may thus be achieved by means of a one-handed operation. As coupling means, for example, a further coupler and/or a further turning and sliding joint may be provided. The phrase "an articulation of one component to another component" is intended to be understood to connote a direct articulated connection with just one joint between the two components. The term "coupler" is intended in each case to mean an articulation to at least two ends of the coupler. An example of a turning and sliding joint is a "slot-pin guide" between two components, consisting of a slot (elongated hole, connecting link, groove, guide) in the one component, in which a pin (bolt, link block or sliding block) of the other component engages. The two possible associations of the slot and pin to the two components are interchangeable and are equivalent to one another.

The shifting movement of the rear foot and the backrest preferably contains—apart from translatory components—a rotational movement—produced by the design of the at least one coupling means—so that the backrest is at least set upright, and is preferably inclined slightly forward in the boarding position. This facilitates boarding.

In a technically simple embodiment, the first turning and sliding joint is formed by such a slot-pin guide, which comprises a pin and a slot encompassing said pin. The pin may undertake further functions, for example as part of the second locking device or as part of a second turning and sliding joint which serves as coupling means.

As the base preferably has at least one seat rail pair, the longitudinal seat position may be adjusted in a finely stepped manner, possibly almost steplessly.

Thus conventional seat rail pairs may be used in which, for example, the two seat rails profiled in a substantially U-shaped manner mutually engage behind one another with their longitudinal edges bent inwards and/or outwards. By the use of such mass-produced products, the production costs of the vehicle seat may be reduced.

The invention is described in more detail hereinafter with reference to two exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is a schematic side view of the first exemplary embodiment in the use position which is furthest forward;

FIG. 1B is a schematic side view corresponding to FIG. 1A of the first exemplary embodiment in a rear use position;

FIG. 1C is a schematic side view corresponding to FIG. 1A of the first exemplary embodiment in the boarding position;

FIG. 1D is a schematic side view corresponding to FIG. 1A of the first exemplary embodiment in the flat-floor position;

FIG. 2A is a schematic side view of the second exemplary embodiment in the use position which is furthest forward;

FIG. 2B is a schematic side view corresponding to FIG. 2A of the second exemplary embodiment in a rear use position;

FIG. 2C is a schematic side view corresponding to FIG. 2A of the second exemplary embodiment in the boarding position;

FIG. 2D is a schematic side view corresponding to FIG. 2A of the second exemplary embodiment in the flat-floor position;

FIG. 3A is a schematic side view showing the second exemplary embodiment in a use position, as a sketch—without the first turning and sliding joint—for improved understanding of the action of the second turning and sliding joint;

FIG. 3B is a schematic side view corresponding to FIG. 3A of the sketch in the flat-floor position; and FIG. 3C is a schematic side view corresponding to FIG. 3A of the sketch in the boarding position.

DESCRIPTION OF THE PREFERRED EMBODIMENTS

Referring to the drawings in particular, a vehicle seat 1 for a front, middle or rear seat row of a motor vehicle, for example of a van, has a seat cushion 3, a backrest 5, which may be adjusted in its inclination relative to the seat cushion 3 by means of fittings 7, and a base 9, which is connected to the structure of the motor vehicle. In the following directional information it is assumed that the vehicle seat 1 is arranged in the motor vehicle in the forward direction of travel, in a use position of the vehicle seat 1 suitable for conveying passengers, the backrest 5 being located at the rear end of the seat cushion 3. By the term "seat cushion" 3 is intended to be understood the entire sub-assembly, consisting of a structure and a covered cushion. In so far as components are articulated to the seat cushion 3, an articulation of the seat cushion 3 to the seat structure may be understood thereby.

For the sake of simplicity, only the left-hand vehicle seat side of the substantially symmetrical vehicle seat 1 is disclosed hereinafter, and namely initially in the use position.

The base 9 has (on both sides) a front foot 11. The front foot 11 may be a partial region of the base 9, a component fixedly connected thereto, a component which may be releasably locked to the base 9 or a combination of two such parts. Between the seat cushion 3 and the base 9 (on both sides) a front leg 13 is provided which is articulated to the front foot 11 (by means of a joint, preferably a simple rotary joint) (or otherwise indirectly or directly coupled). The front leg 13 is articulated (by means of a further joint) to the seat cushion 3, so that the seat cushion 3 is connected in an articulated manner to the front foot 11. The base 9 has in the exemplary embodiment (on both sides) a seat rail pair which offers the possibility of longitudinal adjustment of the vehicle seat 1, but may alternatively be configured as a single component connected fixedly to the vehicle structure, or the vehicle structure itself. The different variants of the base 9 may also be combined to form a modular system. In the case of a front foot 11 releasably connected to the base 9, the vehicle seat 1 may be removed.

Moreover, in the direction of travel (on both sides) behind the front foot 11 and the front leg 13, a rear foot 21 separately formed from the front foot 11 and from the front leg 13 is arranged on the base 9. The rear foot 21 is releasably locked to the base 9 by means of a first locking device 23 fastened to the rear foot 21, for example a rotary latch lock. The rear foot 21 is coupled by means of a four bar linkage to the front foot 11 (or generally to the base 9). To this end, a first guide rod 27 and a second guide rod 29 are provided which in each case are articulated, on the one hand, to the front foot 11 and, on the other hand, to the rear foot 21 and namely in each case spaced apart from one another. The seat cushion 3 and the rear foot 21 are coupled by means of at least one coupling means in a manner disclosed below in more detail. On the rear foot 21, a first fitting part of the fitting 7 is also fastened, whilst a second fitting part of the fitting 7 which may be rotated relative to the first fitting part is fastened to the backrest 5.

A coupler 30 which is intended to be used for coupling between the seat cushion 3 and backrest 5, is articulated at one end to the backrest 5 and has at the other end a slot 30a which—with free travel—encompasses a pin 31, whereby a first turning and sliding joint 32 is defined. The pin 31 is associated with at least one coupling means or the seat cushion. The coupler 30 preferably has an L-shape so that in the use position it does not protrude over the surfaces of the seat cushion 3 and backrest 5 facing the occupant. A second locking device 33 which is intended to lock the at least one coupling means releasably between the seat cushion 3 and the rear foot 21, preferably has a pawl 33a, which (preferably by means of a hook aperture) cooperates with the pin 31 or a further pin, which accordingly is also a part of the second locking device 33.

In this respect, the two exemplary embodiments are equivalent. A difference is in the coupling means between the seat cushion 3 and the rear foot 21.

In the first exemplary embodiment a rear leg 41 is provided as coupling means between the seat cushion 3 and the rear foot 21. The rear leg 41, on the one hand, is articulated by means of a lower joint to the rear foot 21 and, on the other hand is articulated by means of an upper joint, to the seat cushion 3. The rear leg 41 also carries the pin 31 (arranged approximately between the two joints) which, on the one hand, provides with the slot 30a the free travel for the coupler 30. The pawl 33a of the second locking device 33 which is articulated to the rear foot 21, cooperates with a counter element on the rear leg 41, for example the pin 31. The second locking device 33 thus locks the rear foot 21 directly to the rear leg 41 and indirectly to the seat cushion 3.

In the second exemplary embodiment a second turning and sliding joint 42 is provided as a coupling means between the seat cushion 3 and the rear foot 21, said turning and sliding joint being defined in the present case by the pin 31 fastened to the seat cushion 3 and a slot (defining a guide track for the pin 31) in the rear foot 21. Additionally, the pin 31 cooperates as part of the second locking device 33 with the pawl 33a thereof, which is articulated to the rear foot 21. The second locking device 33 thus locks the rear foot 21 directly to the seat cushion 3, but not entirely, so that the (locked) second turning and sliding joint 42 may still act as a rotary joint. For improved understanding of the action of the second turning and sliding joint 42 in FIGS. 3A to 3C a view (sketch) is shown without the first turning and sliding joint 32, i.e. in particular without the slot 30a in the coupler 30.

The mode of operation of the two exemplary embodiments once again coincides.

The first turning and sliding joint 32 provided according to the invention permits a restricted movement of the coupler 30—on the free travel—relative to the seat cushion 3, i.e. the seat cushion 3 and backrest 5 are uncoupled—beyond the free travel defined by the first turning and sliding joint 32. For adjusting the inclination of the backrest 5, the fitting 7 is unlocked (or driven) and the backrest 5 pivoted, which moves the coupler 30. The inclination of the seat cushion 3 thus remains unaffected. The free travel, i.e. the length of the slot 30a relative to the diameter of the pin 31, is adapted to the inclination adjustment range of the backrest 5. In the drawings, a front use position (FIG. 1A, FIG. 2A) and a rear use position (FIG. 1B, FIG. 2B) are shown. The view of FIG. 3A only has use positions in which an alteration of the inclination of the backrest 5 forces an alteration of the inclination of the seat cushion 3.

For transferring the vehicle seat 1 into a boarding position (FIG. 1C, FIG. 2C) as a specific non-use position, the first locking device 23 is unlocked. The backrest 5 carries out a shifting movement to the front by means of the rear foot 21. The exact path of the rear foot 21 is defined by the guide rods 27 and 29, which guide the rear foot 21 together with the backrest 5 during the shifting movement. Generally, the shifting movement is a superimposition of translatory and rotary movements. The seat cushion 3 pivots upwards (and at the same time forwards) by means of the front leg 13 and the at least one coupling means with the rear foot 21 (locked rear leg 41 or locked turning and sliding joint 42), in order to come closer to an upright position. Just one degree of freedom is present for the combination of the pivoting movement of the seat cushion 3 and the shifting movement of the backrest 5. The transfer is carried out as a result of just this one degree of freedom, by at least one of the components to be moved (for example the seat cushion 3 or the backrest 5) of the vehicle seat 1 being acted upon manually and/or by means of a spring (or optionally by motor), and as a result forced or pulled forward. The variants are equivalent to one another, i.e. the seat cushion 3 may be acted upon and drives the rear foot 21 together with the backrest 5, or the backrest 5 is acted upon and forces the seat cushion 3 upwards by means of the rear foot 21.

When reaching the boarding position (FIG. 1C, FIG. 2C), for example when the front leg 13 reaches a stop, the surfaces of the seat cushion 3 and backrest 5 formerly facing the occupant face at least approximately forward. The seat cushion 3 and backrest 5 are arranged compactly, which facilitates access to a rear seat row or increases the loading area. Optionally, in the boarding position two parts which are moved relative to one another may be locked together. For example, the first locking device 23 may lock the rear foot 21 to the front foot 11 or to a further part of the base 9. It is also possible that the seat cushion 3 or the backrest 5 is locked to the base 9. Relative to the boarding position, the view of FIG. 3C is equivalent to the second exemplary embodiment (FIG. 2C).

The return to the previously adopted use position takes place—optionally after releasing the aforementioned locking—in the reverse sequence of the disclosed steps.

For transferring the vehicle seat 1 into a flat-floor position (FIG. 1D, FIG. 2D) as a further specific non-use position, the fitting 7 and the second locking device 33 are unlocked. The backrest 5 pivots forward into an—at least approximately— horizontal position. In this case, it acts by means of the coupler 30 on the at least one coupling means between the seat cushion 3 and rear foot 21 (unlocked rear leg 41 or unlocked second turning and sliding joint 42) i.e. the coupler 30 forces the pin 31 forwards and downwards, whereby the seat cushion 3—by pivoting the front leg 13 forward—is lowered. When reaching the flat-floor position, for example when the backrest 5 bears against the seat cushion 3 or when the front leg 13 reaches a stop, the surfaces of the seat cushion 3 and backrest 5 formerly facing the occupant, at least approximately face one another. The seat cushion 3 and backrest 5 are compactly arranged, which increases the loading area. Optionally, in the flat-floor position two parts which are moved relative to one another may be locked together, for example the fitting 7 or the second locking device 33 with the backrest 5. Relative to the flat-floor position, the view of FIG. 3B is equivalent to the second exemplary embodiment (FIG. 2D).

The return to the previously adopted use position takes place—optionally after releasing the aforementioned locking—in the reverse sequence of the disclosed steps.

While specific embodiments of the invention have been described in detail to illustrate the application of the principles of the invention, it will be understood that the invention may be embodied otherwise without departing from such principles.

LIST OF REFERENCE NUMERALS

1 Vehicle seat
3 Seat cushion
5 Backrest
7 Fitting
9 Base
11 Front foot
13 Front leg
21 Rear foot
23 First locking device
27 First guide rod
29 Second guide rod
30 Coupler
30*a* Slot
31 Pin
32 First turning and sliding joint
33 Second locking device
33*a* Pawl
41 Rear leg
42 Second turning and sliding joint

What is claimed is:
1. A motor vehicle seat comprising:
a base with a front foot;
a front leg;
a seat cushion connected in an articulated manner to the front foot by means of the front leg;
a first locking device;
a rear foot locked to the base by the first locking device in at least one use position suitable for conveying passengers, said rear foot being slidably mounted to said base;
a guide rod between the front foot and the rear foot;
a coupling means for coupling between the seat cushion and the rear foot;
a backrest pivotally mounted to the rear foot;
a coupler between the backrest, on the one hand, and the coupling means or the seat cushion, on the other hand, wherein the vehicle seat is transferable from the use position into a boarding position, after unlocking the rear foot, as a rear edge of the seat cushion pivots upwards and the backrest carries out a forward shifting movement by means of the rear foot, guided by the guide rod and the vehicle seat is transferable from the use position into a flat-floor position, by the backrest pivoting forward and the seat cushion being lowered by means of the coupler;
a turning and sliding joint, the coupler being coupled to the coupling means or the seat cushion by means of the turning and sliding joint; and
a second locking device releasably locking the coupling means.
2. A motor vehicle seat according to claim 1, further comprising a fitting, wherein the backrest is adjusted in inclination relative to the rear foot by means of the fitting, whereby a plurality of use positions are defined.

3. A motor vehicle seat according to claim 2, wherein the turning and sliding joint uncouples the seat cushion and the coupling means from the coupler during the adjustment of the inclination of the backrest.

4. A motor vehicle seat according to claim 2, wherein the second locking device locks the coupling means in the use positions during the adjustment of the inclination and when transferring into the boarding position.

5. A motor vehicle seat according to claim 1, wherein the turning and sliding joint acts as a rotary joint when transferred into the boarding position.

6. A motor vehicle seat according to claim 1, wherein the turning and sliding joint comprises a pin and a slot in the coupler, which encompasses the pin with free travel.

7. A motor vehicle seat according to claim 6, wherein:
the second locking device includes a pawl; and
the pin is also a part of the second locking device and cooperates with the pawl thereof.

8. A motor vehicle seat according to claim 6, further comprising a rear leg forming said coupling means, the rear leg being articulated to the seat cushion and being articulated to the rear foot wherein the rear leg bears the pin.

9. A motor vehicle seat according to claim 1, further comprising another turning and sliding joint forming said coupling means.

10. A motor vehicle seat according to claim 9, wherein:
the turning and sliding joint comprises a pin and a slot in the coupler, which encompasses the pin with free travel; and
the pin is also part of the another turning and sliding joint.

11. A motor vehicle seat according to claim 1, further comprising a rear leg forming said coupling means, the rear leg being articulated to the seat cushion and being articulated to the rear foot.

12. A motor vehicle seat according to claim 1, wherein during the transfer into the flat-floor position the second locking device is unlocked and the backrest lowers the seat cushion, by means of the action of the coupler on the coupling means.

13. A motor vehicle seat comprising:
a base;
a front foot connected to the base;
a front leg;
a seat cushion connected in an articulated manner to the front foot by means of the front leg;
a first locking device;
a rear foot locked to the base by the first locking device in at least one use position suitable for conveying passengers, said rear foot being slidably connected to said base;
a guide rod connecting the front foot and the rear foot;
a coupling between the seat cushion and the rear foot;
a backrest pivotably connected to the rear foot;
a coupler between the backrest and the coupling or the seat cushion wherein the vehicle seat is transferable from the use position into a boarding position, after unlocking the rear foot, as a rear edge of the seat cushion pivots upwards and the backrest carries out a forward shifting movement by means of the rear foot, guided by the guide rod and the vehicle seat is transferable from the use position into a flat-floor position, by the backrest pivoting forward and the seat cushion being lowered by means of the coupler;
a turning and sliding joint, the coupler being coupled to the coupling or the seat cushion by means of the turning and sliding joint; and
a second locking device releasably locking the coupling.

14. A motor vehicle seat according to claim 13, further comprising a fitting, wherein the backrest is adjusted in inclination relative to the rear foot by means of the fitting, whereby a plurality of use positions are defined.

15. A motor vehicle seat according to claim 14, wherein the turning and sliding joint uncouples the seat cushion and the coupling from the coupler during the adjustment of the inclination of the backrest.

16. A motor vehicle seat according to claim 14, wherein the second locking device locks the coupling in the use positions during the adjustment of the inclination and when transferring into the boarding position.

17. A motor vehicle seat according to claim 15, wherein the turning and sliding joint acts as a rotary joint when transferred into the boarding position.

18. A motor vehicle seat according to claim 14, wherein:
the turning and sliding joint comprises a pin and a slot in the coupler, which encompasses the pin with free travel;
the second locking device includes a pawl; and
the pin is also a part of the second locking device and cooperates with the pawl thereof.

19. A motor vehicle seat according to claim 13, wherein:
the turning and sliding joint comprises a pin and a slot in the coupler, which encompasses the pin with free travel;
the coupling comprises another turning and sliding joint; and
the pin is also part of the another turning and sliding joint.

20. A motor vehicle seat according to claim 13, wherein the coupling comprises a rear leg, the rear leg being articulated to the seat cushion and being articulated to the rear foot.

* * * * *